United States Patent [19]

Stapleton et al.

[11] 4,062,633
[45] Dec. 13, 1977

[54] O-RING INSPECTION METHOD AND APPARATUS

[75] Inventors: Thomas T. Stapleton, Bloomfield Hills; Herbert E. Rober, Roseville, both of Mich.

[73] Assignee: General Motors Corporation, Detroit, Mich.

[21] Appl. No.: 726,776

[22] Filed: Sept. 27, 1976

[51] Int. Cl.² ............................................. G01B 11/10
[52] U.S. Cl. ................................. 356/159; 356/167; 356/200; 356/244
[58] Field of Search ............... 356/159, 160, 167, 199, 356/200, 244, 237

[56] References Cited

U.S. PATENT DOCUMENTS

| | | | |
|---|---|---|---|
| 3,870,890 | 3/1975 | Binks et al. | 356/160 |
| 3,874,798 | 4/1975 | Antonsson et al. | 356/159 |
| 3,947,129 | 3/1976 | Wiklund | 356/159 |

FOREIGN PATENT DOCUMENTS 2,448,651  4/1975  Germany ............................ 356/159

Primary Examiner—John K. Corbin
Assistant Examiner—R. A. Rosenberger
Attorney, Agent, or Firm—Warren D. Hill

[57] ABSTRACT

A pair of mandrels crossing at a right angle are moved into the center of an O-ring and then spread apart to stretch the O-ring around the mandrels to secure it and to form it into a twisted path. The mandrels are rotated to drive the O-ring through the twisted path so that the angular orientation of any given cross section of the O-ring changes as it advances around the path. An optical measurement apparatus senses cross section diameter of the O-ring at several locations and frequently repeats the measurement during the O-ring movement. The diameters are electrically compared to determine dimensional anomalies in the O-ring.

3 Claims, 4 Drawing Figures

O-RING INSPECTION METHOD AND APPARATUS

This invention relates to a method and apparatus for inspecting O-rings.

In the past it has been impractical to thoroughly inspect all the O-rings used in a large scale assembly operation. When the O-rings are used, for example, as seals in a hydraulic mechanism, the mechanism is tested after assembly for leakage. For each leakage that occurs due to a defective O-ring, the mechanism must be disassembled for O-ring replacement. That expensive repair procedure can be minimized or eliminated by inspecting each O-ring before its use. It is a common practice to use visual inspection of individual O-rings, however, this is time consuming and is generally applied only to selected samples.

It is therefore an object of the invention to provide a method of rapidly performing an inexpensive and thorough inspection of O-rings and to provide an apparatus for such inspection.

The invention is carried out by inserting a pair of crossed mandrels into the center of an O-ring presented at an inspection station; spreading the mandrels to stretch the O-ring and form it into a twisted path, driving the O-ring through the path and optically measuring the cross sectional dimensions of the O-ring in several locations as it transverses the twisted path. The invention is further carried out by providing an inspection machine having a pair of mandrels movable along one axis for insertion into an O-ring having means for moving at least one of the mandrels laterally of that axis to stretch the O-rings into a twisted configuration about the mandrels, a motor for driving the mandrels to move the O-ring through a twisted path, and an optical measuring system for measuring the cross sectional dimensions of the O-ring while it is moving into the twisted path.

The above and other advantages will be made more apparent from the following specification taken in conjunction with the accompanying drawings wherein like reference numerals refer to like parts and wherein.

Figure 1:
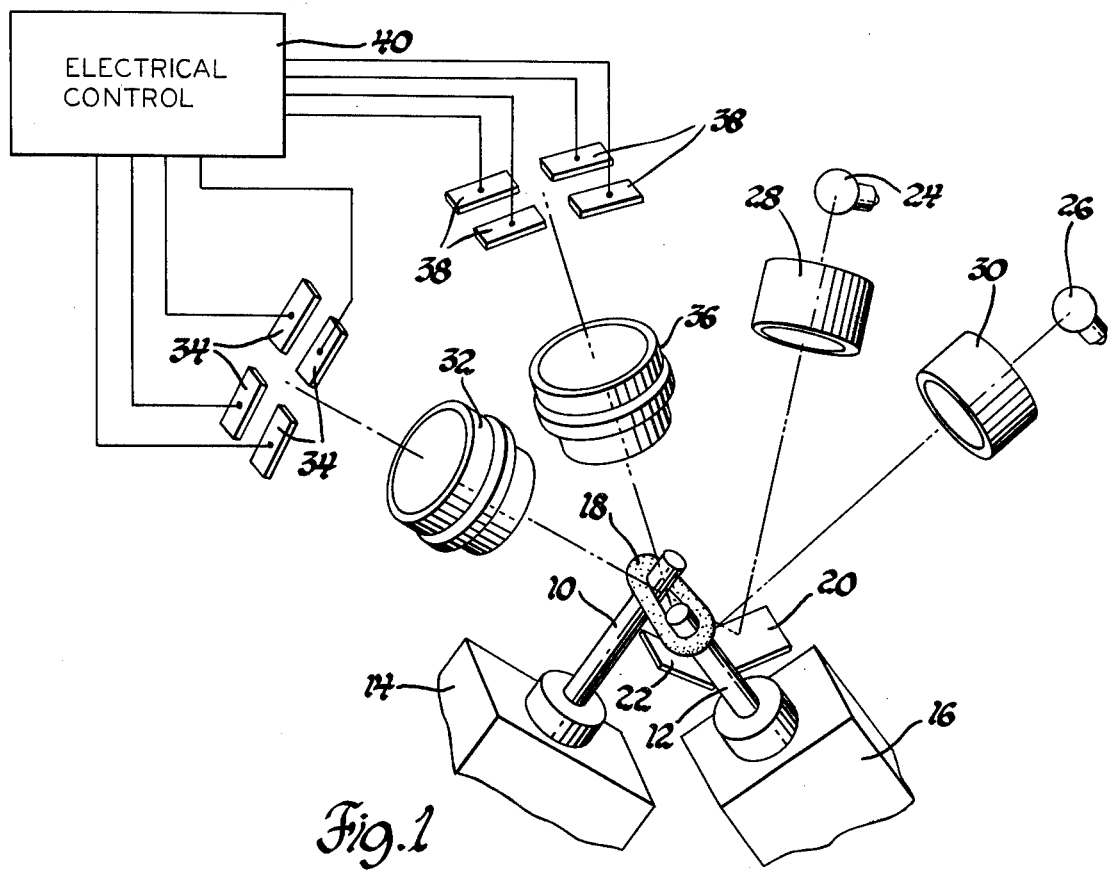
FIG. 1 is a schematic illustration of a portion of the O-ring inspection apparatus and particularly including the optical measuring system according to the invention.

FIG. 1 depicts the principle of operation of the subject invention and includes a pair of spaced arbors or mandrels 10 and 12 rotatably carried by spindles 14 and 16, respectively. The mandrel 10 is rotatably driven by a motor, not shown. The mandrels, although in separate planes, are crossed at approximately right angles in order to securely grip and O-ring 18 which is stretched around the mandrels. Because of the angular diposition of the mandrels, the O-ring is contorted into a twisted path and since the mandrel 10 is rotating, the O-ring progressively moves through that twisted path. Because of the twist, any given cross-sectional element of the O-ring changes its angular disposition as it advances around the twisted path. A pair of mirrors 20 and 22 are disposed generally beneath the O-ring. Incandescent lamps 24 and 26 provide light beams focused by condensing lenses 28 and 30 onto the mirrors 20 and 22, respectively, to provide back lighting of the O-ring. A silhouette or shadow image of the O-ring sections stretched between the mandrels is projected by an imaging lens 32 onto a group of four self-scanned photodiode linear arrays 34, while a similar silhouette taken from a different angle is projected from lens 36 onto another set of four photodiode arrays 38.

Each of the photodiode arrays is connected to an electrical control 40 such as a microprocessor or another type of computer which is programmed to control the scanning of the photodiode arrays and to detect the edge position of the shadow images of the O-ring sections for determining the cross sectional diameter at each measuring location. The mandrels rotate the O-ring at a rate of one complete cycle in one second. During this time each array scans 500 times so that 500 cross sections are measured across each of four different angularly displaced diameters to completely inspect the entire O-ring. The electrical control 40 further compares the measured diameters to preset limits and to one another to detect rapid change in diameter thereby sensing any dimensional anomaly which could cause leaks such as flash, splits, missing material and excess material.

Figure 2:
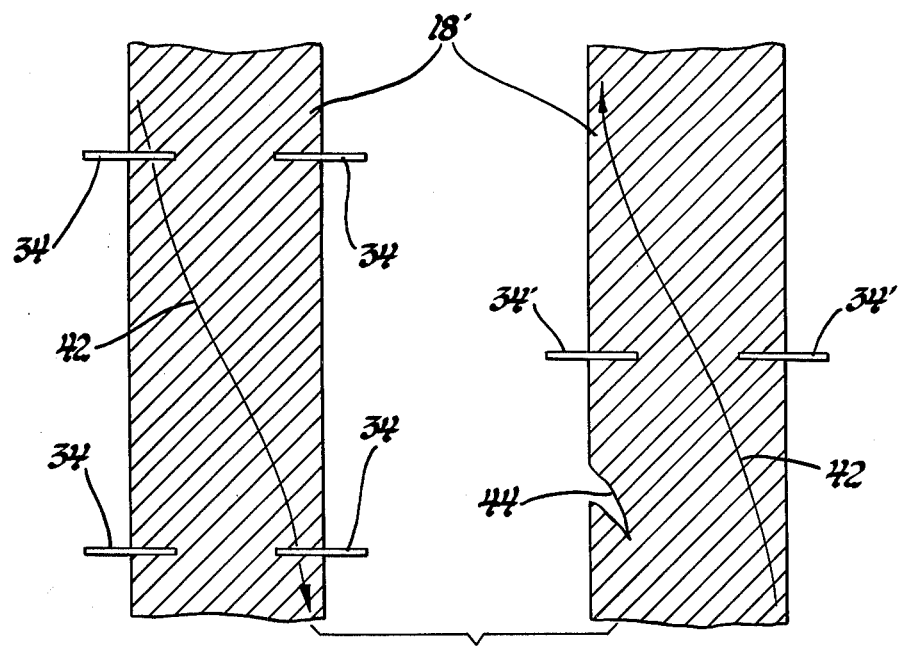
FIG. 2 is an enlarged view of a section of a stretched and twisted O-ring image relative to optical sensing devices.

FIG. 2 shows an enlargement of the shadow image of the O-ring straight line segments 18' which are projected onto the photodiode arrays. The four diode arrays 34 are presented as small thin rectangles which are arranged in pairs so that each pair embraces opposite sides of the O-ring image along one cross section in order to measure a single diameter. As the O-ring advances through the twisted path, as depicted by the arrow 42; the same cross section will be eventually presented to the second pair of arrays for measurement of another diameter at an angle to the first. The diode arrays 34' are shown in FIG. 2 although not in FIG. 1 to illustrate that there is flexibility in the number and arrangement of the diode arrays. Thus as shown in FIG. 2, the arrays 34' are set to gauge the image of the second segment of the O-ring. An O-ring defect is exemplified at 44.

Figure 3:
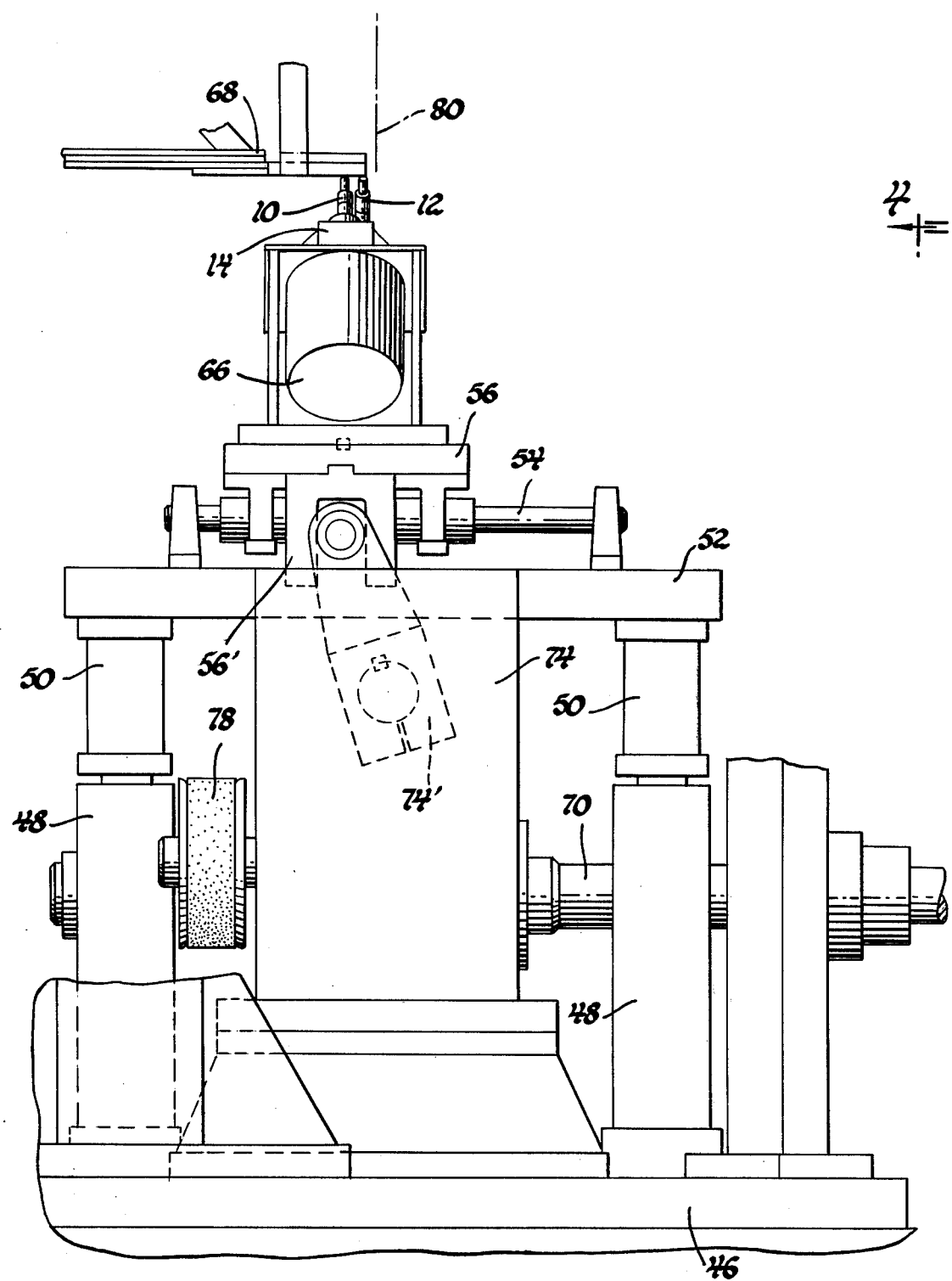
FIG. 3 is a front elevation of the O-ring inspection apparatus with the optical elements omitted.
Figure 4:
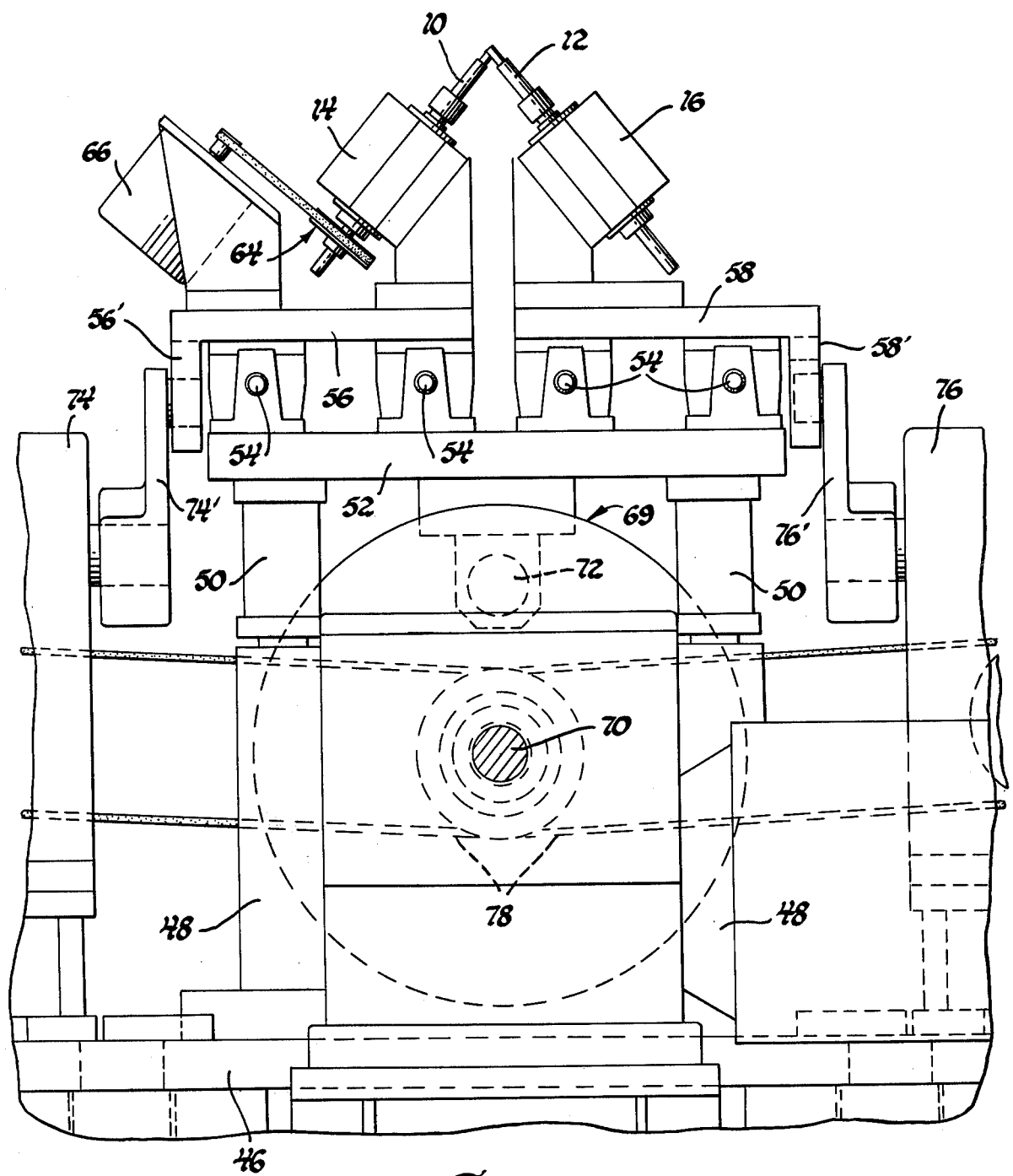
FIG. 4 is a side elevational view of the apparatus taken along lines 4—4 of FIG. 3.

FIGS. 3 and 4 depict the machine for handling the O-rings and presenting them to the optical measuring apparatus which is omitted in these views. The machine includes a base 46, columns 48 carrying telescoping vertical extensions 50 guided in ball bearings. The extensions 50 support a horizontal platform 52. This carries a plurality of horizontal rails 54. A pair of carriages 56 and 58 are slidably carried on the rails for horizontal movement. The carriages 56 and 58 support spindles 14 and 16, respectively, in which the mandrels 10 and 12 respectively are mounted. The mandrel 10 is driven through a belt and pulley arrangement 64 by a motor 66. A chute or tray 68 above the mandrels feeds O-rings to a position aligned with the center of the mandrel assembly. Beneath the platform 52 is a rotating cam assembly 69 having a cam, not shown, driven through a shaft 70 by a motor, not shown. A cam follower 72 depends from the under surface of the platform 52 and engages the cam for control thereby so that as the cam is rotated by the shaft 70, the platform 52 and therefore the mandrels 10 and 12 are raised and lowered according to a prescribed program. Roller oscillators 74 and 76 on either side of the cam assembly are driven by timing belts 78 in synchronism with the rotation of the cam. The mechanical outputs of the roller oscillators are arms 74' and 76' which engage side yokes 56' and 58' on the carriages 56 and 58, respectively, so that the carriages are controlled in their horizontal movement according to preset programs in the roller oscillators 74 and 76.

For simplicity, the optical system is not shown, however, the center line 80 of the lenses 32 and 36 is depicted in FIG. 3 to the right of the mandrels 10 and 12.

In operation, an O-ring is fed along the tray 68 to a position above the mandrels 10 and 12. The cam assembly raises the platform 52 $\frac{1}{2}$ inches to insert the mandrels into the center of the O-ring, then the arm 76' of the roller oscillator 76 shifts the carriage 58 to move the mandrel 12 $\frac{5}{8}$ inches to the left thereby stretching the O-ring as well as twisting it and holding it in place as shown in FIG. 1. The motor 66 runs continuously so that the O-ring is being driven through its twisted path so long as it is engaged by the mandrels.

The movement of the mandrel 12 stretches the O-ring so that its straight segments are in the plane of the axes of the lenses 32 and 36. The O-ring segments are then within the optical field and the images are being measured by the photodiode arrays 34 and 38. When the measurement which takes one second is complete, the arms 74' and 76' are simultaneously actuated to move the mandrel 12 to the right $1\frac{3}{8}$ inches and to move the mandrel 10 to the right 2 inches so that the O-ring is moved to a tray, not shown at an eject station and is released by the mandrels. The ejected O-ring is then passed to a "reject" bin or "accept" bin by well known apparatus, not shown, which is controlled by the electrical control 40. Then the platform 52 is lowered to its original position to withdraw the mandrels from the O-ring; whereupon the roller oscillators 74 and 76 return the mandrels to their initial station. The total machine cycle time for each O-ring is 3.6 seconds.

It will thus be seen that the method and apparatus of this invention provides automatic inspection of an O-ring by the measurement and comparison of thousands of diameters for each O-ring thereby being able to detect any dimensional anomaly of the O-ring.

The embodiments of the invention in which an exclusive property or privilege is claimed are defined as follows:

1. A method for inspecting O-rings by measuring the cross-sectional diameter thereof comprising
   driving an O-ring through a twisted path by stretching and twisting the O-ring over a pair of spaced mandrels, the mandrels being crossed at an angle to effect twisting of the O-ring and rotating one of the mandrels to progressively move the O-ring through a twisted path,
   optically sensing the cross-sectional diameter at a plurality of locations spaced along the path of the O-ring such that due to the twist of the O-ring, a different angular aspect of the O-ring cross section is presented for inspection at each said location, and
   repetitively sampling the said diameter at each said location during the progressive movement of the O-ring thereby obtaining a plurality of diameter measurement of O-ring cross section at each location.

2. A method for inspecting O-rings by measuring the cross-sectional diameter thereof comprising
   inserting the ends of a pair of mandrels through the opening of an O-ring, separating the mandrels to engage and stretch the O-ring, the mandrels being crossed at an angle to effect twisting of the O-ring, and driving the O-ring through a twisted path by rotating one of the mandrels to progressively advance the O-ring around the mandrels,
   optically sensing the cross-sectional diameter at a plurality of locations spaced along the path of the O-ring such that due to the twist of the O-ring, a different angular aspect of the O-ring cross section is presented for inspection at each said location,
   repetitively sampling the said diameter at each said location during the progressive advancement of the O-ring thereby obtaining a plurality of diameter measurement of O-ring cross section at each location, and
   electrically comparing the measured diameters to preset limits and to each other to detect any dimensional anomaly in the O-ring cross sections.

3. An apparatus for inspecting O-rings by measuring the cross-sectional diameter at a plurality of locations thereon comprising
   an optical device for measuring the cross-sectional diameter of an O-ring segment placed within the optical field of the device.
   a pair of mandrels, the mandrels being crossed at an angle,
   means for presenting an O-ring to a position adjacent the mandrels with the O-ring axis aligned with the mandrels,
   means moving the mandrels generally along said axis for inserting the mandrels through the opening of the O-ring,
   means for moving at least one of the mandrels laterally with respect to the axis to move the mandrels apart and move the O-ring into the optical field whereby the O-ring is securely gripped and stretched between the mandrels and contorted into a twisted path due to the crossed disposition of the mandrels,
   a motor connected to rotate one of the mandrels to drive the O-ring through the twisted path for presenting various angular aspects of each cross section of the O-ring to the optical field,
   and electronic control means for directing a plurality of measurements of cross-sectional diameters and comparing such measurements to identify any anomaly in O-ring dimension.

* * * * *